Patented June 28, 1949

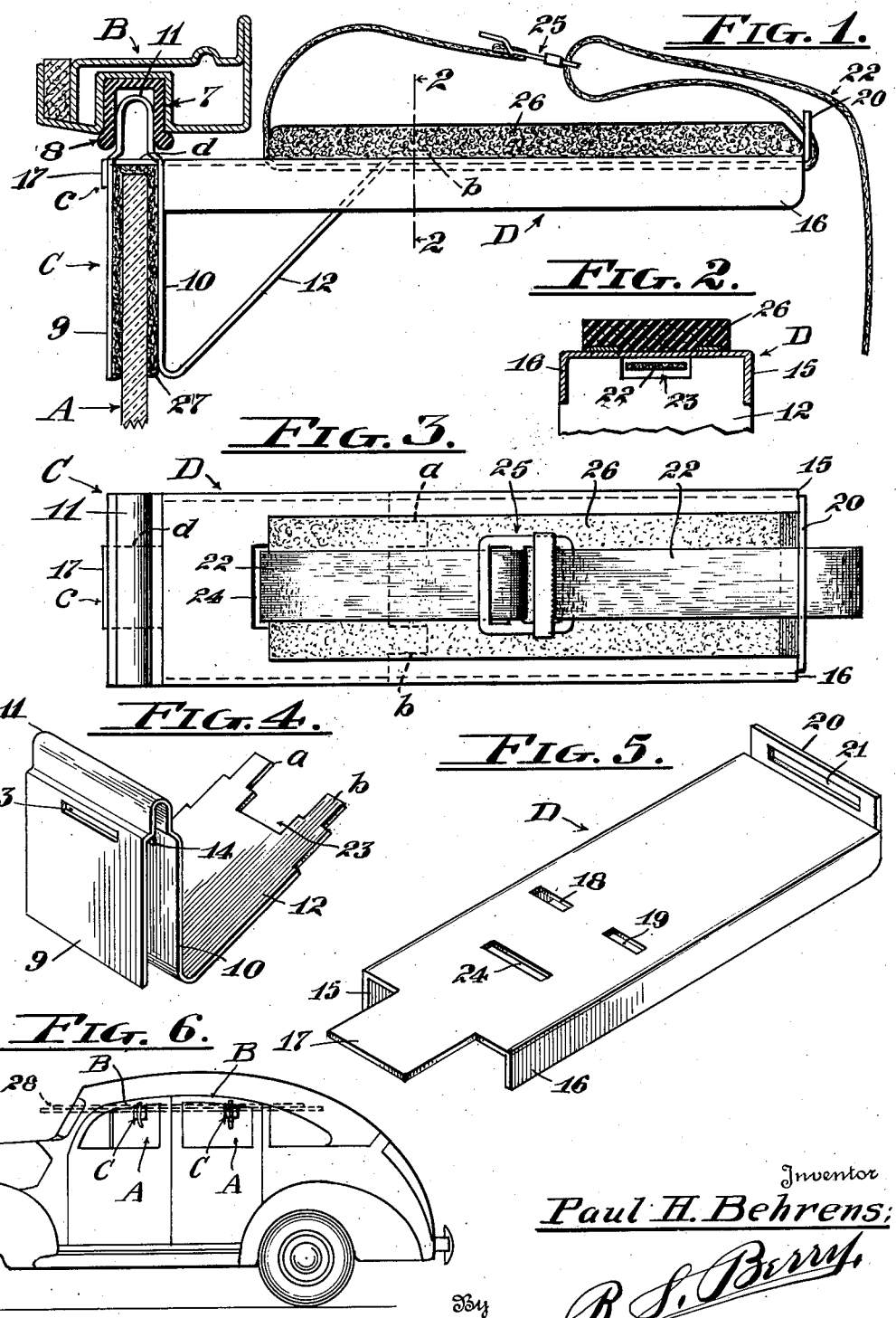

2,474,513

UNITED STATES PATENT OFFICE 2,474,513

BRACKET ATTACHMENT FOR MOTOR VEHICLE WINDOWS

Paul H. Behrens, Alhambra, Calif.

Application January 17, 1948, Serial No. 2,903

4 Claims. (Cl. 224—42.45)

This invention relates to supporting bracket attachment for motor vehicles and has as its primary object a provision of such an attachment which is adapted to be mounted and carried on the vertically slidable glass window panes of which the doors of such vehicles are ordinarily equipped, thus obviating all possibility of marring the finish of the vhicle or the provision of protective means incident to the type of such bracket attachments as are designed for attachment to the window sill or to surface coated portions of the vehicle.

Another object is to provide a construction in a bracket of the above character wherein an interlocking connection is afforded not only with the upper marginal portion of the window pane but also with a groove in the upper rail of the window frame when the window is in its closed or nearly closed position, thereby affording a stable mounting for the support.

A further object is to provide a construction whereby the supporting bracket and its mounting may be readily formed and assembled with the main body portions thereof formed of thin sheet metal so as to be extremely light in weight, yet be so fabricated as to possess requisite strength.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view of the bracket attachment as seen in side elevation illustrating the mode of applying it to the window pane and the upper rail of the window frame of a motor vehicle.

Fig. 2 is a detail in cross section as taken on the line 2—2 of Fig. 1,

Fig. 3 is a plan view of the bracket attachment,

Figs. 4 and 5 are perspective views respectively of the bracket mounting and the bracket element as formed preliminary to their assemblage, and Fig. 6 is a view in side elevation of a motor vehicle showing the invention as applied.

Referring to the drawings more specifically A indicates the vertically slidable glass window pane of a motor vehicle and B designates generally the upper rail of the window frame which embodies a downwardly opening channel 7 lined with a channel cushion 8 into which the upper marginal portion of the window pane extends when the window is in its uppermost closed position.

In carrying out the invention a yoke C is provided which is adapted to be positioned astride the upper portion of the window pane A and also to project into the channel cushion 8. This yoke is formed of a length of sheet metal, preferably shaped as shown in Fig. 4; being bent intermediate its ends to provide spaced parallel side walls 9 and 10 of the yoke which side walls are connected together by a return bend constituting a ridge 11. The side walls of the ridge 11 are contracted relative to the yoke side walls 9 and 10 so as to form the ridge of a width that will readily enter the cushion channel 8. The yoke side wall 10 connects at its lower end with a diagonally extending length of sheet metal 12 which terminates in a pair of spaced tabs a and b. The side walls 9 and 10 are formed with opposed transverse slots 13 and 14 contiguous their juncture with the side walls of the ridge 11.

A bracket element D is provided which is formed of a length of sheet metal having down turned side flanges 15 and 16 forming the bracket element of channel cross section and imparting requisite strength to prevent bending of the bracket element under normal loads imposed thereon. One end of the bracket element is formed with a tongue 17 which is adapted to be inserted in the openings 14 and 13 in the walls 10—9 of the yoke C and to be bent downwardly over the outer face of the wall 9 as indicated at c in Fig. 1, to form an interconnection between the inner end of the bracket element and the yoke and at the same time provide a cross wall d in the yoke at the base of the ridge 11.

The bracket element D is formed with a pair of aligned transversely extending slots 18 and 19 to receive the tabs a and b which on being passed through the slots are bent to overlie the upper face of the bracket element and effect connection between the latter and the diagonal member 12 which then constitutes a brace. The outer end of the bracket element is formed with an upturned flange 20 formed with an elongated slot 21 to receive a strap 22 which extends along the underside of the bracket element and passes through an opening 23 in the brace member 12 and through a slot 24 in the bracket. The end portion of the strap extending through the slot 24 is fitted with a conventional slide fastener 25 through which the free end portion of the strap 22 is passed and engaged in the usual manner in lashing articles on the bracket. A cushion 26 of resilient material, such as sponge rubber, is adhered to the upper face of the bracket and extends longitudinally thereof between the flange 20 and the slot 24 to cushion articles supported on the bracket. The yoke C is lined with a cushion channel 27, the inner end of which abuts the cross wall d which cushion is formed of felt or similar material adhered to the contiguous faces of the yoke side walls 9 and 10.

The bracket thus formed is especially suited for use as a support for fishing rods, poles, light moldings and the like, for which purpose a pair of such brackets are mounted on the windows at one side of the motor vehicle as shown in Fig. 6, thus providing a pair of spaced supports for the rods, poles or moldings as indicated by the dotted lines 28 in Fig. 6. The brackets, however, are not limited to such use since they are adapted to be positioned to extend interiorly of the vehicle as well as exteriorly thereof, and when positioned interiorly of the vehicle may be individually utilized as supports for garment hangers and the like.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. A bracket attachment for motor vehicle windows of the type embodying a vertically slidable glass pane and an upper frame member having a channel, and which attachment includes a yoke for positioning astride the upper marginal portion of the glass pane, and an upstanding ridge embodied in said yoke adapted to project into the channel of the upper rail of the window frame; a bracket element carried by said yoke projecting laterally therefrom, a tongue on said bracket element extending through said yoke at the base of said ridge arranged to extend over the upper edge of the pane, said tongue being fastened to said yoke, a U-shaped cushion internally of said yoke abutting said tongue, and a diagonal brace member formed on said yoke rigidly connected with said bracket element intermediate the ends thereof.

2. In a bracket attachment for motor vehicle windows, a yoke having parallel spaced side walls and a connecting ridge portion formed with opposed slots in said side walls, a diagonal brace member formed in continuation of one of the side walls of said yoke, a bracket element formed with an end tongue which is extended through the opposed openings in said yoke side walls and has its outer end bent over the outer side wall of the yoke, and means interconnecting the diagonal brace member with said bracket element.

3. In a bracket attachment for motor vehicle windows, a yoke having parallel spaced side walls and a connecting ridge portion formed with opposed slots in said side walls, a diagonal brace member formed in continuation of one of the side walls of said yoke, a bracket element formed with an end tongue which is extended through the opposed openings in said yoke side walls and has its outer end bent over the outer side wall of the yoke, means interconnecting the diagonal brace member with said bracket element, and an upstanding ridge formed on said yoke for engagement with the upper rail of a window frame.

4. In a bracket attachment for motor vehicle windows, a yoke having parallel spaced side walls and a connecting ridge portion formed with opposed slots in said side walls, a diagonal brace member formed in continuation of one of the side walls of said yoke, a bracket element formed with an end tongue which is extended through the opposed openings in said yoke side walls and has its outer end bent over the outer side wall of the yoke, means interconnecting the diagonal brace member with said bracket element, and an upstanding flange on the outer end of said bracket element formed with a longitudinal slot, and a lashing strip carried by said bracket element having one end portion thereof extending through said slot and having the other end portion thereof extending through the inner end portion of said bracket element.

PAUL H. BEHRENS.

REFERENCES CITED

The following references are of record in the file of this patent:

UNITED STATES PATENTS

| Number | Name | Date |
|--------|------|------|
| 1,468,412 | Peters | Sept. 18, 1923 |
| 2,157,001 | Morley | May 2, 1939 |
| 2,344,339 | Zwald | Mar. 14, 1944 |